Mar. 13, 1923.

J. A. SPENCER

THERMOSTAT

Filed Apr. 8, 1921

1,448,240

Patented Mar. 13, 1923.

1,448,240

UNITED STATES PATENT OFFICE.

JOHN A. SPENCER, OF REVERE, MASSACHUSETTS, ASSIGNOR TO SPENCER THERMOSTAT COMPANY, OF BOSTON, MASSACHUSETTS, A CORPORATION OF MASSACHUSETTS.

THERMOSTAT.

Application filed April 8, 1921. Serial No. 459,773.

*To all whom it may concern:*

Be it known that I, JOHN A. SPENCER, a citizen of the United States, residing at Revere, in the county of Suffolk and State of Massachusetts, have invented certain new and useful Improvements in Thermostats; and I do hereby declare the following to be a full, clear, and exact description of the invention, such as will enable others skilled in the art to which it appertains to make and use the same.

The present invention relates to temperature controlled apparatus and more particularly to devices of this character adapted to operate valves, switches and other members when certain temperature limits are reached.

Thermostatic controls for heating and other apparatus consisting of two dissimilar metals having different coefficients of thermal expansion have long been used. These controls have certain very decided objections, however, primarily due to the fact that the change of state takes place slowly in accordance with the change in temperature.

The object of the present invention is to provide an improved type of thermostatic control applicable to a variety of purposes and which overcomes the objections inherent in existing controls of this character.

With this object in view one feature of the invention contemplates the provision of a thermostatic device to which is imparted a sudden and rapid movement when a substantially predetermined temperature is reached.

In the simplest and most efficient form of the invention which has yet been devised a relatively thin sheet consisting of two metals having different thermal coefficients of expansion is formed into a non-developable sheet. When this device is heated to a certain point the sheet is suddenly caused to curve in a direction opposite to that in which it is initially curved, remaining in this condition until the temperature is substantially lowered. Upon reaching a predetermined lower limit of temperature, the sheet is suddenly arched or curved in the opposite direction. The configuration of the thermostatic sheet is such that change of shape due to initial changes of temperature is normally resisted until the stresses imposed by variation of temperature overcome this normal resistance, the thermostatic sheet thereafter abruptly changing to a shape of opposite curvature. The action of this device may be compared to the principle of a toggle lever having a spring which normally holds it in an inclined or broken position. In the present case the unequal expansion or contraction of the metals forming the disk provides the force for reversing the curvature of the non-developable sheet.

Figure 1:
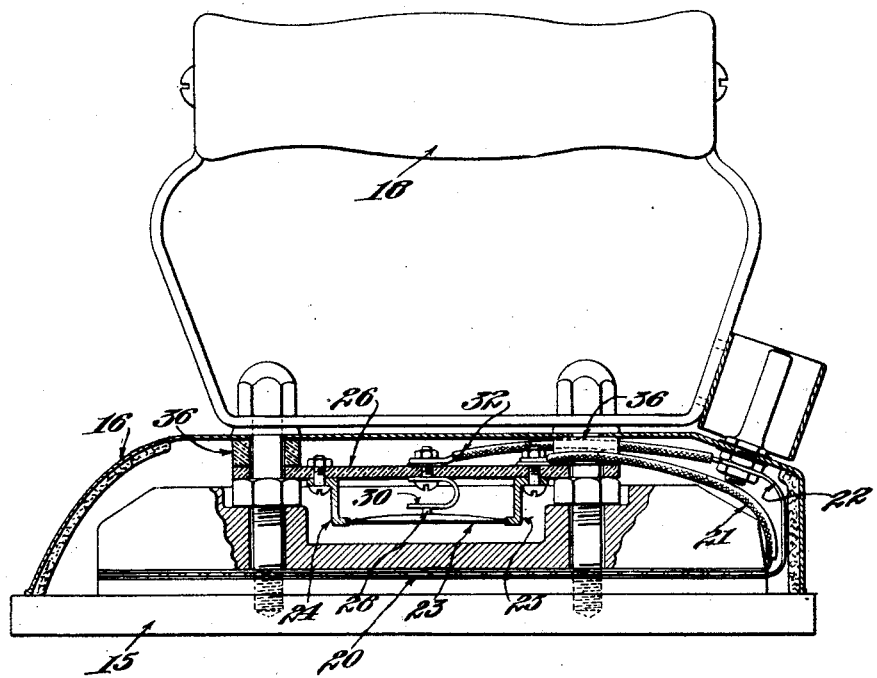
Figure 2:

In the accompanying drawings illustrating the preferred form of the invention Fig. 1 represents the invention embodied in an electric flatiron and used for controlling the flow of current to the iron; Fig. 2 represents the new thermostatic device devoloped upon the surface of a sphere and Fig. 3 illustrates a somewhat different form of control.

The illustrated embodiment of the invention is shown particularly in connection with the thermostatic control of electric circuits in which connection the present invention has particular utility, owing to the quick breaking of the circuit which results from the sudden reversal of shape of the thermostatic sheet. Referring to the accompanying drawings the thermostatic control is indicated in Fig. 2 as a composite sheet made up of two materials, in this instance two metals such as iron and brass, having different thermal coefficients of expansion so that a change in temperature will cause unequal expansion and contraction of opposite faces of the sheet. This sheet is shaped into a cupped portion or non-developable surface, as, for example, by forming a spherical projection 10 in a flat sheet 11. If a thermostatic sheet is thus shaped and constructed it will be found that upon raising the temperature the unequal expansion of the materials forming the sheet will cause a tendency to flatten the cupped surface until at a predetermined temperature a sudden curving of the non-developable surface into the opposite direction occurs, which reversal of shape or flexure will be maintained until the temperature has been substantially lowered. Thereafter upon reaching a substantially predetermined temperature the sheet will suddenly return to its initial shape. In both of these movements the reversal of curvature is exceedingly abrupt and is caused by the expansion and contraction of the materials of which the thermostatic sheet is composed. Free expansion and contraction of the inner portion of the dent or curve of the sheet is opposed or prevented by the material surrounding said portion. Upon rise of temperature the expansion of the materials of the inner portion causes stresses to be set up in the materials. When these stresses are sufficient to cause the device to reach a condition of instability (this condition is reached at a predetermined temperature) the ensuing sudden liberation of the stored stresses effects a sudden movement of said portion, the movement occurring automatically.

The uses to which a thermostatic control may be put are manifold especially in connection with the control of electric circuits as the action of the non-developable sheet is sudden and positive and the reversal of shape occurs with considerable force, depending upon the thickness of the sheet and the area of the surface which undergoes the change. For example, the illustrated embodiment is shown as applied to an electric flatiron comprising a presser member 15, a shell 16 and a handle 18. The flatiron is heated by the usual coil 20 connected into an electric circuit through leads 21 and 22. The thermostatic control is inserted in one side of the circuit, as shown, and may consist of a curved sheet 23 of two dissimilar metals retained at its opposite edges in brackets 24 and 25 secured to a base 26 of insulating material. The arched control member 23 is provided with a contact 28 which cooperates with a stationary contact 30 secured to the base member and connected with a lead 32. The base member and elements carried thereby may be conveniently insulated from the iron in any suitable manner as by insulator bushings or sleeves 36. With such a construction the flow of current to the heater resistance is automatically cut off when an excessive temperature limit is reached, the arched sheet 23 at this point suddenly breaking the circuit through the two contacts 28 and 30. When the temperature of the thermostatic sheet has been reduced (that is, changed in opposite sense or direction) to a predetermined point it will return to its initial position and close the circuit. It will be obvious that with such a construction a positive and effective mechanism is provided for preventing overheating of the electric iron with the consequent disastrous results. Furthermore the control will operate indefinitely without deterioration as the sudden breaking of the circuit prevents any substantial arcing between the contact points.

Figure 3:

Fig. 3 illustrates a somewhat different form of thermostatic control, enabling a somewhat greater separation of the contacts to be obtained. In this construction an arm 40 is formed of two dissimilar metals and is provided with a broken curve at 42 to form a non-developable surface. This arm is supported at 44 and the opposite free end carries a contact member 45 which may be adapted to cooperate with a stationary contact 46. If the temperature of this arm be then raised it will be obvious that a curving of the surface in the opposite direction at 42 will result in a substantial movement of the contact 45 away from the stationary contact 46 with a correspondingly rapid breaking of the circuit.

It should be understood that the present invention is not limited to any particular combination of materials having different thermal coefficients of expansion but is intended to embrace in its scope any combination of materials having dissimilar thermal coefficients of expansion sufficient to cause the characteristic reversal of curvature. Furthermore, the two materials comprising the composite thermostatic sheet may be secured together in any desired manner by riveting, soldering, brazing or otherwise although it is preferred to unite the materials comprising the sheet by welding or similar means to secure a substantially indivisible sheet.

From the foregoing it will be evident that in one aspect the invention involves a thermostatic device characterized by portions (the central and marginal portions of the discs in Figs. 1 and 2) arranged to react upon each other with change of temperature to set up stresses the magnitude of which changes upon change of temperature, at least one of the portions being formed of different metals or other components having different coefficients of expansion, the device reaching a condition of instability at a predetermined temperature by virtue of the arrangement of said portions and as a result of the differential expansion of the components due to change of temperature, whereupon said stresses becomes effective to change abruptly the relative position of said portions.

Having described the invention, what is claimed is:

1. A thermostat comprising a bimetallic sheet of thermostatic metal, the outer portion of the sheet forcing the inner portion to remain normally concave or dished on the side having the higher thermal coefficient of expansion and preventing free expansion of said inner portion when heated, said inner portion when heated tending to pass abruptly and automatically to a position of an opposite curvature, and passing abruptly and automatically to said position at a predetermined temperature.

2. A thermostat comprising a bimetallic sheet of thermostatic metal, the outer portion of the sheet forcing the inner portion to remain normally concave or dished on the side having the higher thermal coefficient of expansion and preventing free expansion of said inner portion when heated, said inner portion when heated passing abruptly and automatically to a position of an opposite curvature, and resuming its original position abruptly and automatically when cooled to a predetermined temperature.

3. A thermostat comprising composite thermostatic material and means for confining a portion of said material against free change of shape, thereby setting up internal stresses the magnitude of which change upon changes of temperature, the thermostat reaching a condition of instability at a predetermined temperature during heating and at a predetermined temperature during cooling, the device then abruptly changing its shape.

4. A thermostat comprising composite thermostatic material and means for confining at least a portion of said material against free change of shape, thereby setting up internal stresses the magnitude of which change upon changes of temperature, the thermostat reaching a condition of instability at a predetermined temperature during heating and at a predetermined temperature during cooling, the material then abruptly changing its shape due to release of internal stresses stored up in the material by reason of the change of temperature to said predetermined value.

5. A thermostat comprising composite thermostatic material and means for confining at least a portion of said material against free expansion, thereby setting up internal stresses the magnitude of which change upon changes of temperature, the thermostat reaching a condition of instability when it is heated to a predetermined temperature, the material then abruptly changing its shape due to release of internal stresses theretofore stored up in the material.

6. A thermostat comprising composite thermostatic material and means for confining at least a portion of said material against free expansion, thereby setting up internal stresses the magnitude of which change upon changes of temperature, the thermostat reaching a condition of instability when it is cooled to a predetermined temperature, the material then abruptly changing its shape due to release of internal stresses theretofore stored up in the material.

7. A thermostat comprising thermostatic composite material, a portion of which is confined against free change of shape, thereby setting up internal stresses the magnitude of which change upon changes of temperature, the material being so shaped that change of its shape is a discontinuous function of the temperature.

8. A thermostat comprising a sheet of composite thermostatic material, at least a portion of which is confined against free change of shape, thereby setting up internal stresses the magnitude of which change upon changes of temperature, the thermostat being so shaped that change of its shape is a discontinuous function of the temperature.

9. A thermostat comprising a composite thermostatic sheet having a non-developable depression adapted to change its shape suddenly on reaching a predetermined temperature.

10. A thermostat comprising a composite thermostatic sheet having a dent automatically adapted to store energy in the form of internal stresses on change of temperature, said stresses at a predetermined temperature balancing and overcoming the resistance of the dent to reversal, the dent then abruptly and automatically reversing.

11. A thermostat comprising a composite thermostatic sheet having a dent automatically adapted to store energy in the form of internal stresses on change of temperature, said stresses at a predetermined temperature balancing and overcoming the resistance of the dent to reversal, the dent then abruptly and automatically reversing, and upon change of temperature in the opposite direction to a predetermined value abruptly and automatically reverting to its original contour.

12. A thermostat comprising a composite thermostatic sheet having at least a part of its surface in the form of a dent of such a depth and shape that upon reaching a predetermined temperature the dent reaches a condition of instability and thereupon suddenly alters its shape due to release of internal stresses caused by change of temperature.

13. A thermostat having a composite thermostatic sheet portion curved and a second portion which is stressed by the expansion of the first portion when heated and which opposes the expansion of the first portion, the first portion when heated to a predetermined temperature tending to pass abruptly and automatically to another shape.

14. A thermostat having a composite thermostatic sheet portion curved and a second portion which is stressed by the expansion of the first portion when heated and which opposes the expansion of the first portion, the first portion when heated to a predetermined temperature tending to pass abruptly and automatically to another shape and tending to resume its original shape automatically and abruptly when cooled to a predetermined temperature.

15. A thermostat having a composite thermostatic sheet portion and a second portion which is stressed by the expansion or contraction of the first portion with change of temperature and which opposes said expansion or contraction, the first portion when it attains a predetermined temperature tending to pass abruptly and automatically to another shape.

16. A thermostat comprising a plurality of united components having different coefficients of expansion, said components being normally flexed in one direction and tending to flatten in response to temperature change in one sense, thereby setting up stresses which oppose said tendency, until a predetermined temperature is reached, the stresses then changing the flexure.

17. A thermostat comprising a composite sheet having a cupped portion with different coefficients of expansion on opposite sides, the peripheral portion of the sheet being adapted to be stressed by differential expansion of the opposite sides of the sheet until a predetermined temperature is reached, whereupon the stresses become effective abruptly to reverse the curvature of the cupped portion.

18. A thermostatic device comprising portions arranged to react upon each other with change of temperature to set up stresses the magnitude of which changes upon change of temperature, at least one of the portions being formed of components having different coefficients of expansion, the device reaching a condition of instability at a predetermined temperature by virtue of the arrangement of said portions and as a result of the change of temperature, whereupon said stresses become effective to change abruptly the relative position of said portions.

JOHN A. SPENCER.